Dec. 23, 1930.  J. BEAUDRY  1,786,388
CULTIVATOR
Filed Sept. 24, 1928   2 Sheets-Sheet 1
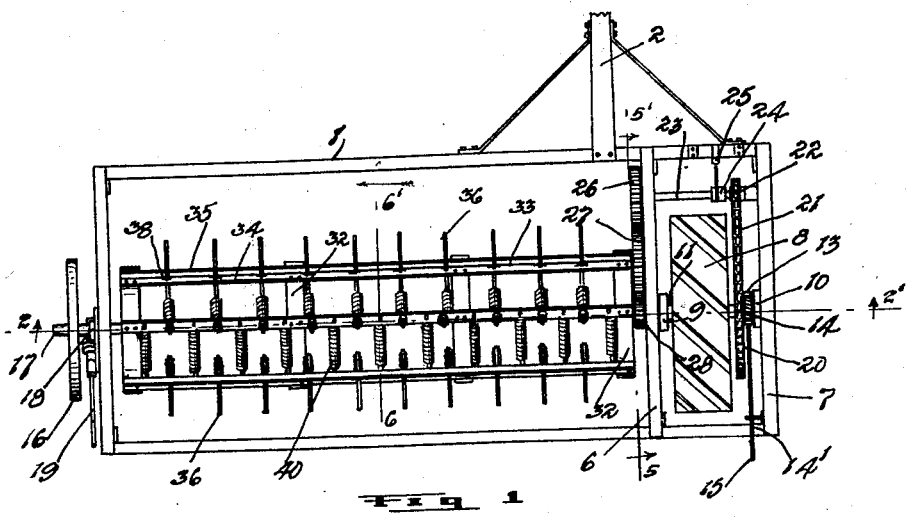
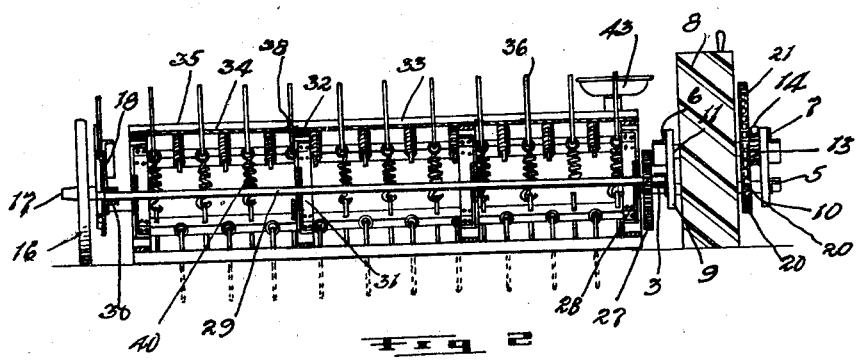
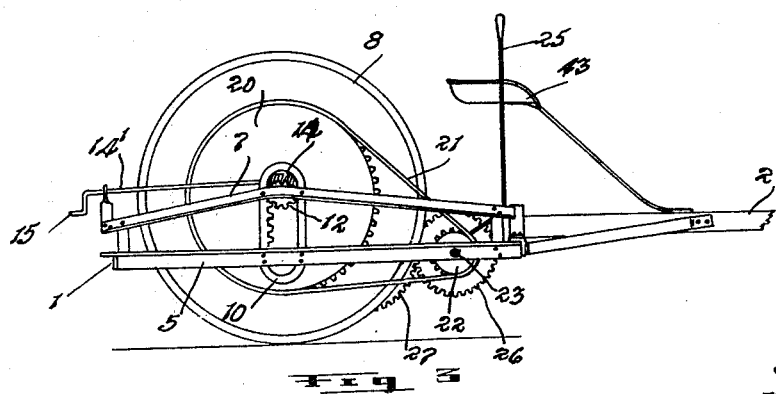
Inventor
J. Beaudry Dec. 23, 1930. J. BEAUDRY 1,786,388
CULTIVATOR
Filed Sept. 24, 1928 2 Sheets-Sheet 2
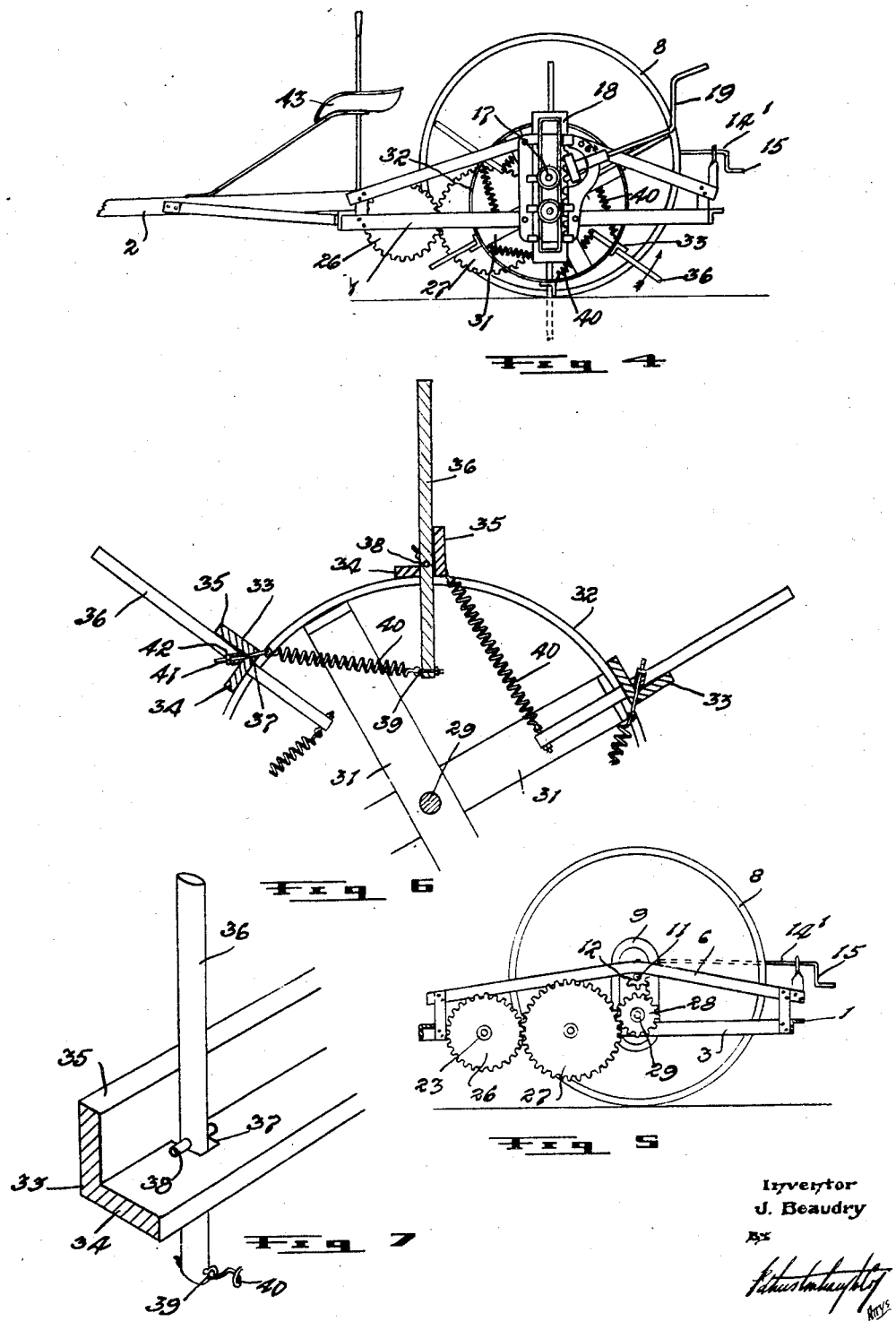

Patented Dec. 23, 1930

1,786,388

UNITED STATES PATENT OFFICE

JOSEPH BEAUDRY, OF SOMERSET, MANITOBA, CANADA

CULTIVATOR

Application filed September 24, 1928. Serial No. 307,907.

The invention relates to improvements in cultivators and an object of the invention is to provide a rotary cultivator which can be driven over the land and which will effectively destroy weeds and leave the same exposed on the land surface to be killed by the sun and elements.

A further object of the invention is to provide a cultivator having a rotating toothed skeleton drum which is rotated at a relatively high speed as the machine advances, the teeth effectively cultivating the ground and pulling out weed roots and to arrange the machine so that the drum can be raised or lowered in respect to the ground thereby controlling the depth at which the teeth work.

A still further object of the invention is to construct the drum in a simple, durable and inexpensive manner and such that the teeth are held normally in working position by spring pressure, such also permitting the teeth to clear an obstruction such as a stone or root which they may engage, provision being made also for tensioning the springs.

With the above more important objects in view, the invention consists essentially in the arrangement and construction of parts hereinafter more particularly described, reference being had to the accompanying drawings, in which:—

Fig. 1 is a plan view of the machine.

Fig. 2 is a vertical sectional view at 2—2′ Fig. 1.

Figs. 3 and 4 are end views of the opposite ends of the machine, the grain wheel being removed in Fig. 4.

Fig. 5 is a vertical sectional view at 5—5′ Figure 1.

Fig. 6 is an enlarged detailed vertical sectional view at 6—6′ Figure 1.

Fig. 7 is a perspective view of one of the drum teeth and showing the supporting bar.

In the drawings like characters of reference indicate corresponding parts in the several figures, certain parts being shown in rear elevation.

The machine frame 1 is substantially rectangular and it is provided at the front side with a suitably positioned and braced draft tongue 2 to which the draft animals are hitched. Adjoining one end of the machine, I locate a cross beam 3 parallel to the adjacent end beam 5 and these latter beams support elevated parallel cross beams 6 and 7.

The bull or master wheel 8 adjustably supports the latter end of the machine and the adjustment provided is of the well known type as customarily used on binding machines now on the market and on such account a detailed description thereof is not given. The adjustment embodies opposing toothed segments 9 and 10 permanently secured to the beams 3, 6, 5 and 7 respectively and the bull wheel shaft 11 is supplied with similar gears 12 operating on the segments and also with a worm wheel 13 which is engaged by a worm 14 carried by an operating shaft 14′ fitted at the rear end with a crank 15, the arrangement being such that the turning of the crank rotates the worm wheel and consequently causes the gears to move up or down in respect to the segments and so raise or lower that end of the frame in respect to the ground.

The opposite end of the frame is carried by a grain wheel 16 which is also adjustable, the adjustment being the same as provided on binding machines of the well known type. The axle 17 of the wheel is carried by a vertically movable rack 18, the rack being raised and lowered by the turning of a crank 19.

The bull wheel shaft is fitted with a chain wheel 20 connected by a chain 21 to a chain wheel 22 rotatably mounted on a counter shaft 23 carried by the frame. Clutch members indicated generally by the reference numeral 24 are provided so that by the manipulation of the lever 25, one can couple the counter shaft to the chain wheel and so cause the bull wheel to drive the counter shaft when desired.

The inner end of the counter shaft is supplied with a gear wheel 26 which meshes continuously with a further gear wheel 27 carried by the frame and the latter gear wheel meshes continuously with a gear 28 permanently secured to the end of the drum shaft 29. The drum shaft extends from the beam 3 to the end beam 30 of the main frame and is rotatably carried in suitable bearings provided on said beams. The arrangement of the train of gears is such that the drum shaft is driven at a relatively high speed as the machine moves over the ground.

The shaft 29 carries a skeleton drum which is formed by radiating spoke like members 31 secured to the shaft and having their outer ends supporting suitably spaced circular bands 32. A plurality of similar suitably spaced lengthwise extending and parallel bars 33 are permanently fastened to the bands, the bars being herein shown as relatively heavy angle irons presenting a flange 34 fastened to the bands and a flange 35 disposed radial thereto.

Each bar 33 carries a row of similar teeth 36, the teeth in the row being all similarly mounted. Each tooth is somewhat oval in horizontal cross section and passes through an opening 37 provided in the flange 34 of the bar and is supplied with a pivot pin 38 resting on the outer flange 34 of the bar. The inner end of the tooth carries an eye 39 to which I connect one end of a coiled spring 40, to the outer end of which is fastened an eye bolt 41. The latter eye bolt passes slidably through the adjoining bar 33 and is provided with an adjusting nut 42 whereby one can by tightening up the nut vary the tension of the spring. The hole 37 is somewhat larger than the tooth, such permitting the tooth to swing back should the outer tip of the same strike an obstruction such as a stone or root.

The adjacent rows of teeth are in staggered relation and accordingly the ground surface is effectively cultivated by the teeth when the machine is in use. The operator's seat 43 is carried by the tongue 2 and is located adjacent the lever 25 so that the attendant can easily control the rotation of the drum. In actual practice, the main frame will be provided with a shield or curved plate overlying the front side of the drum, such guarding the operator against accident. The plate is not herein shown.

This machine is particularly desirable for eradicating weeds such as couch grass, sow thistle and so forth. It is simply driven over the ground, the attendant setting the drum at the depth at which he desires the teeth to cultivate. As the machine advances, the drum which is revolving at a relatively high speed in the direction as indicated by the applied arrow Figure 4 effectively uproots the weeds, cultivates the ground and leaves the weeds lying exposed on the ground surface where they are exposed to the sun and elements and quickly die.

What I claim as my invention is:—

1. In a cultivator, a rotatably mounted drum having spaced longitudinally disposed angle bars at the periphery thereof, a row of teeth carried by each bar, the teeth in the rows passing through suitable openings provided in the bars and each tooth being pivotally mounted on the bar and adjustable tensioned springs connecting the inner ends of the teeth to the drum.

2. In a cultivator, a rotatably mounted drum having spaced lengthwise extending angle bars at the periphery thereof, one flange of the bar in each instance being fastened to the drum and the other flange extending radial to the drum, a row of spaced teeth passing through suitable slots provided in the fastened flange of each bar, pivot pins carried by the teeth and resting on the outer face of the latter flange and adjustable tensioned springs connecting the inner ends of the teeth to the drum.

3. In a cultivator, a rotatably mounted drum having spaced lengthwise extending angle bars at the periphery thereof, one flange of the bar in each instance being fastened to the drum and the other flange extending radial to the drum, a row of spaced teeth passing through suitable slots provided in the fastened flange of each bar, pivot pins carried by the teeth and resting on the outer face of the latter flange, adjustable tension springs connecting the inner ends of the teeth to the drum and means for rotating the drum at a relatively high speed in the direction of travel of the cultivator.

Signed at Somerset, in Manitoba, this 23rd day of June, 1928.

JOSEPH BEAUDRY.